Jan. 16, 1923.
R. V. L. HARTLEY.
ELECTRON DISCHARGE DEVICE.
FILED DEC. 31, 1919.
1,442,430.
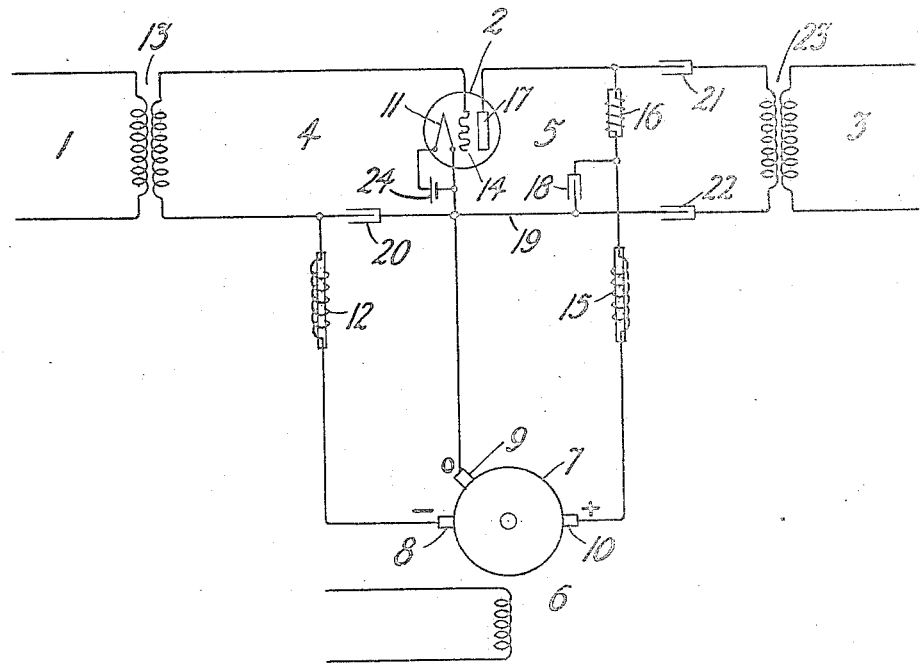
Inventor:
Ralph V. L. Hartley.
by W. E. Beatty,
Atty.

Patented Jan. 16, 1923.

1,442,430

UNITED STATES PATENT OFFICE.

RALPH V. L. HARTLEY, OF EAST ORANGE, NEW JERSEY, ASSIGNOR TO WESTERN ELECTRIC COMPANY, INCORPORATED, OF NEW YORK, N. Y., A CORPORATION OF NEW YORK.

ELECTRON-DISCHARGE DEVICE.

Application filed December 31, 1919. Serial No. 348,580.

*To all whom it may concern:*

Be it known that I, RALPH V. L. HARTLEY, a citizen of the United States, residing at East Orange, in the county of Essex and State of New Jersey, have invented certain new and useful Improvements in Electron-Discharge Devices, of which the following is a full, clear, concise, and exact description.

The invention relates to circuits employing electron discharge devices which necessitate a plurality of energizing sources of potential. For instance, the audion type tube commonly employs one source potential for the filamentary cathode, another source of potential for producing the space current between the cathode and anode, and at times a third source of potential for giving the grid a steady negative potential with respect to the cathode. If the voltage of only one of these sources changes, due to current drain, temperature conditions, aging or the like, without a corresponding change taking place in the voltage of the other sources, a variation in the operation characteristics of the vacuum tube will result.

An object of the present invention is to reduce the variations in the operation characteristics of electron discharge tubes which are caused by variations in the energizing voltages applied to the electrodes.

To this end the energizing sources of voltage may be derived from a generator provided with a plurality of sets of brushes, one of the sets supplying an anode circuit, another set supplying a grid circuit. Variations in the speed of the generator will affect the anode and control electrode voltages in opposite senses, and so tend to neutralize their effect on the plate current.

For further details of the invention, reference may be made to the drawing which diagrammatically represents the tube circuit supplied with a current from a two-winding generator.

The incoming line 1 is adapted to be traversed by weak impulses to be amplified by the vacuum tube 2 and sent on to the outgoing line 3. The grid and plate circuits 4 and 5 are supplied with current from the generator 6, armature 7 of which is provided with two windings in circuit with the brushes 8, 9, 10. The brush 9 is connected to the cathode 11. The brush 8 is connected through choke coil 12 and the secondary of transformer 13 to the grid 14. The brush 10 is connected through choke coils 15 and 16 to the anode 17. If the potential of brush 9 be taken as zero then brush 8 is at a negative potential with respect thereto, and brush 10 is positive with respect to 9. At a point between the choke coils 15 and 16, the condenser 18 is connected at one terminal and at the other terminal to the line 19 connected to the cathode 11 and to the brush 9. A condenser 20 is similarly provided between choke coil 12 and the brush 9. The condensers 18 and 20 insure that any fluctuations in the voltages supplied by the generator 6 which succeed in passing the choke coils 12 and 15 will find an easy path through these condensers back to the machine and will, therefore, not be effectively impressed upon the vacuum tube 2. The condenser 20 also serves to by-pass around the generator circuit between brushes 8 and 9 the applied waves to be repeated. The condensers 21 and 22 may be employed to keep direct current from generator 6 out of the primary winding of transformer 23.

It will be apparent that if the generator 6 increases in speed, the plate 17 will receive a higher voltage tending to increase the space current in the tube. This is counteracted, however, by the larger negative potential of the brush 8 which supplies a larger negative potential to the grid 14, thereby restricting the space current. It is apparent that a similar compensation is provided in the case where the generator decreases in speed.

The filament 11 has been shown as supplied with current from a battery 24, but may of course be supplied with current from any other suitable source, as for instance the generator 6, instead. While these arrangements are shown in connection with a vacuum tube repeater for repeating substantially without distortion, they may, of course, be applied to a tube when used as an oscillator, modulator, detector, or for other purposes.

What is claimed is:

1. A system comprising a thermionic device, an electro-magnetic generator, two leads from points of different potentials on said generator for supplying from said generator to said device an operating potential difference subject to changes which tend to deleteriously alter the operation of said device, and an additional lead, from a point on said generator at a potential different from said first mentioned potentials, for supplying from said generator to said device stabilizing potential variations compensating for said changes, whereby the operation of said device is maintained substantially independent of changes in the voltage output of said generator.

2. A system comprising a thermionic device having three electrodes, a dynamo electric generator and three leads from three points of different potentials on said generator, two of said three leads supplying from said generator to one pair of said electrodes an operating potential difference subject to changes which tend to deleteriously alter the operation of said device, and two of said three leads supplying from said generator to another pair of said electrodes stabilizing voltage variations compensating for said changes, whereby the operation of said device is maintained substantially idependent of variations in the operating voltages supplied by said generator.

3. A system comprising a thermionic device having an anode, a cathode and a control electrode, a direct current electromagnetic generator, a lead extending from a point of one potential on said generator and connecting said generator to said cathode, a lead extending from a point on said generator at a potential different from that of any part of said cathode and connecting said generator to said control electrode, and a lead extending from a point on said generator at a potential different from either of said two first mentioned potentials and connecting said generator to said anode.

4. A system comprising a thermionic device having an anode, a cathode and a control electrode, a dynamo electric generator, a lead extending from a point of one potential on said generator and connecting said generator to said cathode, a lead extending from a point on said generator at a potential lower than that of any point on said cathode and connecting said generator to said control electrode, and a lead extending from a point on said generator at a potential different from either of said two first mentioned potentials and connecting said generator to said anode.

5. In combination, a thermionic device comprising a plurality of electrodes, a generator having an armature and a plurality of brushes on said armature, a connection from one of said brushes to one of said electrodes, a connection from a second of said brushes to a second of said electrodes, and a connection from a third of said brushes to a third electrode of said device.

6. In combination, a thermionic device comprising an anode, a cathode, and a control electrode, a generator comprising an armature and a plurality of brushes, a connection between one of said brushes and said anode, a connection between another of said brushes and said control electrode, and a connection between said cathode and a third of said brushes, said third brush having a potential intermediate the potentials of the other two of said brushes.

7. A system comprising a thermionic device having a cathode, an anode and a control electrode, a source of electro-motive force for energizing said cathode, an electro-magnetic generator, two leads from points of different potentials on said generator for supplying from said generator to said anode and said cathode a potential difference subject to changes which tend to alter the operation of said device, and a third lead, from a point on said generator at a potential different from said first mentioned potentials, for supplying from said generator to said control electrode stabilizing potential variations compensating for said changes.

8. A system comprising a thermionic device having a cathode, an anode and a control electrode, a source of electromotive force for energizing said cathode, an electro-magnetic generator, two leads from points of different potentials on said generator for supplying from said generator to said anode and said cathode a potential difference subject to changes which tend to alter the operation of said device, and a third lead, from a point on said generator at a potential different from said first mentioned potentials, for supplying from said generator to said control electrode stabilizing potential negative with respect to all parts of said cathode and varying in accordance with said potential difference supplied to said anode and said cathode.

9. A system comprising a thermionic device having three electrodes of different character, a generator having commutating means, three leads from three points of different potentials on said commutating means, one pair of said three leads supplying from said generator to one pair of said electrodes an operating potential difference subject to changes which tend to deleteriously alter the operation of said device, and another pair of said three leads supplying from said generator to another pair of said electrodes stabilizing voltage variations compensating for said changes, and means for reducing the effects of voltage fluctuations due to said commutating means upon both of said pairs of electrodes.

10. A system comprising a thermionic repeater having an anode, a cathode and a control electrode, a generator having commutating means, a lead extending from a point of one potential on said commutating means and connecting said generator to said cathode, a lead extending from a point on said commutating means at a potential lower than that of any part of said cathode and connecting said generator to said control electrode, a lead extending from a point on said commutating means at a potential different from either of said two first mentioned potentials and connecting said generator to said anode, and filter means associated with said two first mentioned leads for preventing commutation impulses from said generator from being applied to said control electrode.

11. A system comprising a thermionic repeater having an anode, a cathode and a control electrode, a generator having commutating means, a lead extending from a point of one potential on said commutating means and connecting said generator to said cathode, a lead extending from a point on said commutating means at a potential lower than that of any part of said cathode and connecting said generator to said control electrode, a lead extending from a point on said commutating means at a potential different from either of said two first mentioned potentials and connecting said generator to said anode, and means for reducing the effect of voltage fluctuations due to said commutating means upon said control electrode and for by-passing around the part of said generator between said two first mentioned points the applied waves to be repeated.

In witness whereof, I hereunto subscribe my name this 29th day of December A. D., 1919.

RALPH V. L. HARTLEY.